(12) United States Patent
Banerjea et al.

(10) Patent No.: US 8,660,617 B1
(45) Date of Patent: Feb. 25, 2014

(54) WIMAX ENHANCED SLEEP MODE

(75) Inventors: Raja Banerjea, Sunnyvale, CA (US); Robert B. Ganton, San Diego, CA (US); Timothy J. Donovan, Livermore, CA (US); Bhaskar Chowdhuri, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 1652 days.

(21) Appl. No.: 11/642,817

(22) Filed: Dec. 19, 2006

Related U.S. Application Data

(60) Provisional application No. 60/771,629, filed on Feb. 9, 2006.

(51) Int. Cl.
*H04M 1/00* (2006.01)

(52) U.S. Cl.
USPC ......... 455/574; 455/572; 455/522; 455/412.2

(58) Field of Classification Search
USPC ............... 455/422.1, 572, 574, 343.1–343.5; 370/208, 311
See application file for complete search history.

(56) References Cited

U.S. PATENT DOCUMENTS

| | | | |
|---|---|---|---|
| 5,487,181 A * | 1/1996 | Dailey et al. | 455/90.2 |
| 7,751,356 B2 | 7/2010 | Kim et al. | |
| 2004/0029620 A1 | 2/2004 | Karaoguz | 455/574 |
| 2005/0049013 A1 * | 3/2005 | Chang et al. | 455/574 |
| 2006/0094366 A1 | 5/2006 | Cho et al. | |
| 2006/0203766 A1 | 9/2006 | Kim et al. | |
| 2007/0286066 A1 * | 12/2007 | Zhang et al. | 370/208 |
| 2008/0165716 A1 * | 7/2008 | Choi et al. | 370/311 |

FOREIGN PATENT DOCUMENTS

| | | |
|---|---|---|
| WO | WO-2005/008359 A2 | 1/2005 |
| WO | WO-2005/065056 A2 | 7/2005 |

OTHER PUBLICATIONS

International Search Report issued in counterpart international application No. PCT/US07/03803, dated Dec. 12, 2007, 3 pages.
IEEE Standards, "802.16 IEEE Standard for Local and Metropolitan Area Networks, Part 16: Air Interface for Fixed Broadband Wireless Access Systems", *IEEE Computer Society and the IEEE Microwave Theory and Techniques Society publication*, 2004, 893 pages.
IEEE Standards, "802.16e IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1", *IEEE Computer Society and the IEEE Microwave Theory and Techniques Society publication*, 2005, 864 pages.

* cited by examiner

Primary Examiner — Kathy Wang-Hurst

(57) ABSTRACT

Power consumption is managed in a subscriber station of a communication system. The subscriber station is engaged in a sleep mode, including reducing a frequency of a system clock of the subscriber station. When the subscriber station receives, while in the sleep mode, a message having downlink transmission parameters while, the frequency of the system clock of the subscriber station is increased to process the message. After processing the message, the frequency of the system clock is reduced.

22 Claims, 7 Drawing Sheets

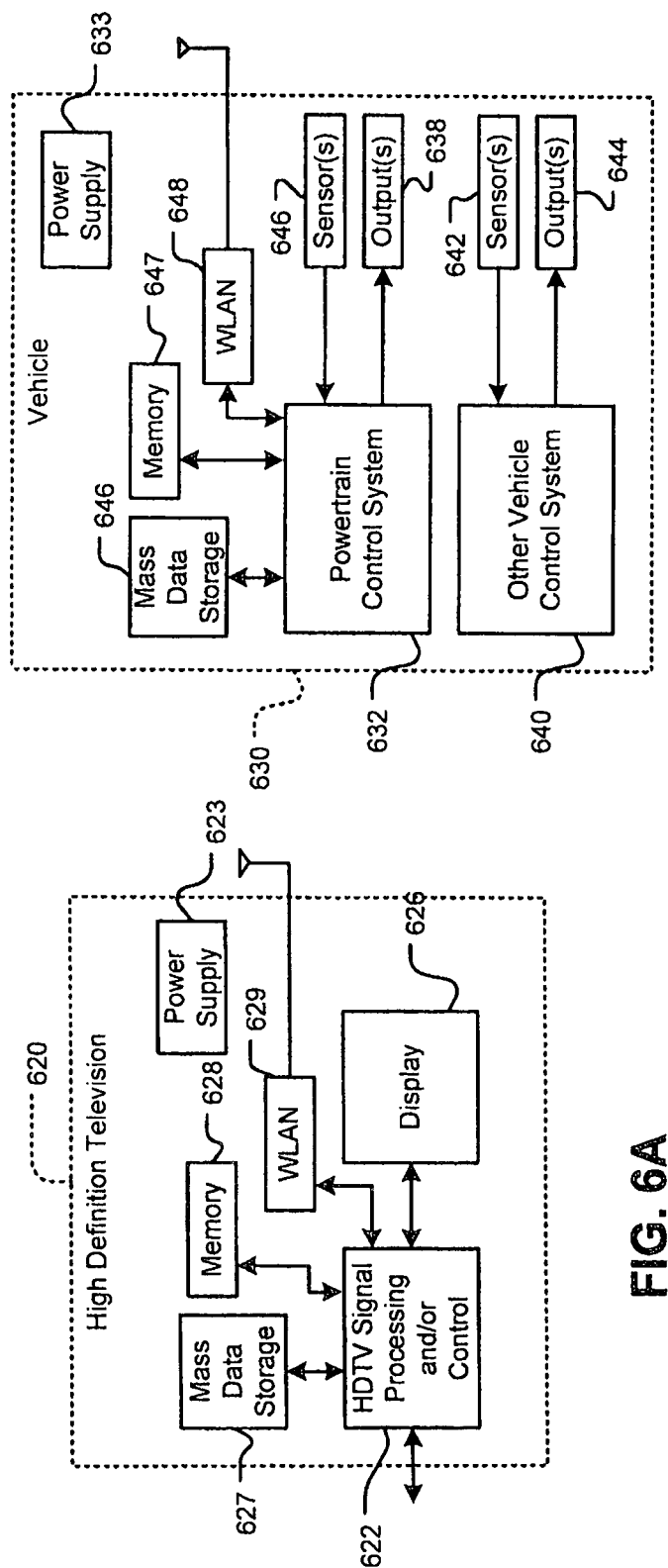

WIMAX ENHANCED SLEEP MODE

CROSS-REFERENCE TO RELATED APPLICATION

This application claims the benefit of U.S. Provisional Application No. 60/771,629, filed Feb. 9, 2006, which is hereby incorporated herein by reference.

BACKGROUND

The present invention relates generally to wireless communication devices and methods. More particularly, this method relates to an enhanced sleep mode operation for a broadband wireless communication system.

Wireless communication systems are being developed to permit high speed, wireless communication of data from point to point in a network. For such a system, an air interface standard defines transmission formats and timing to permit reliable communication between transmitters and receivers. Other features and capabilities may be added by the air interface as well. The transmitters and receivers may be stand-alone devices such as mobile telephones or may be incorporated with other devices such as computers or routers.

One example of such a system is known as Worldwide Interoperability for Microwave Access, or WiMAX™ referred to herein after as WiMAX. WiMAX is defined according to standards published by the Institute of Electrical and Electronics Engineers (IEEE) which are generally referred to as IEEE 802.16. One version of the standard, generally referred to as 802.16e, sets forth requirements with respect to access by both fixed and mobile devices. In a WiMAX system, a subscriber station can communicate by radio with one or more base stations (BS). Each BS provides communication services to subscriber stations in a service area near the BS. In a WiMAX system, communication can be point to point or point to multipoint, and a subscriber station can have multiple active or inactive connections to other radios in the system.

A key feature required for use by a mobile device is a low power sleep mode. Mobile devices are powered by rechargeable batteries, and minimization of power consumption is a key design feature. When a mobile device is not transmitting or receiving data in an active mode, the mobile device is able to enter the low power sleep mode to conserve battery power. When the device receives a trigger, it discontinues the sleep mode and resumes normal operation in the active mode.

For entry into sleep mode, a WiMAX mobile device negotiates sleep mode per connection. In the negotiation, the mobile device exchanges sleep duration, awaken duration and sleep start duration with the network. If all connections are in sleep mode, the subscriber station can start low power mode operation. The subscriber station exits the low power operation if it receives any one of (1) a wake up message, or mobile traffic indication message, which indicates the system has data to transmit to the subscriber station; (2) data traffic on the connection identifier (CID) which is in sleep mode; or (3) data traffic from a host interface which uses the subscriber station to communicate with the WiMAX network.

While sleep mode operation has been successful in reducing battery power consumption and extending the operating life of mobile devices, it would be desirable to provide for an improved method and apparatus for controlling sleep mode operation in a wireless communication system such as a WiMAX network.

SUMMARY

By way of introduction, the preferred embodiments described below provide a method and system for reduced power consumption in a subscriber station of a wireless communication system. In one preferred embodiment, a traffic indicator message is designated to be positioned at or near a first burst to be transmitted to the subscriber station. The subscriber station may then decode and process only the first portion of the transmission to determine if it should return to sleep mode based on whether or not the traffic indicator message is present. In another preferred embodiment, a clock signal provided to a decoder in the v station has a variable frequency, the frequency being adjusted based on the nature of the data to be decoded. Data needing immediate decoding is processed with a high speed clock. Other data are processed with a lower speed clock to reduce power consumption. In still another preferred embodiment, control information that is demodulated when the subscriber station is inactive in the sleep mode is batch processed when the subscriber station becomes active again. Other preferred embodiments are provided, and each of the preferred embodiments described herein can be used alone or in combination with one another.

The preferred embodiments will now be described with reference to the attached drawings.

BRIEF DESCRIPTION OF THE DRAWINGS

FIG. 6A is a functional block diagram of a high definition television;
FIG. 6B is a functional block diagram of a vehicle control system.

DETAILED DESCRIPTION OF THE PRESENTLY PREFERRED EMBODIMENTS

Figure 1:
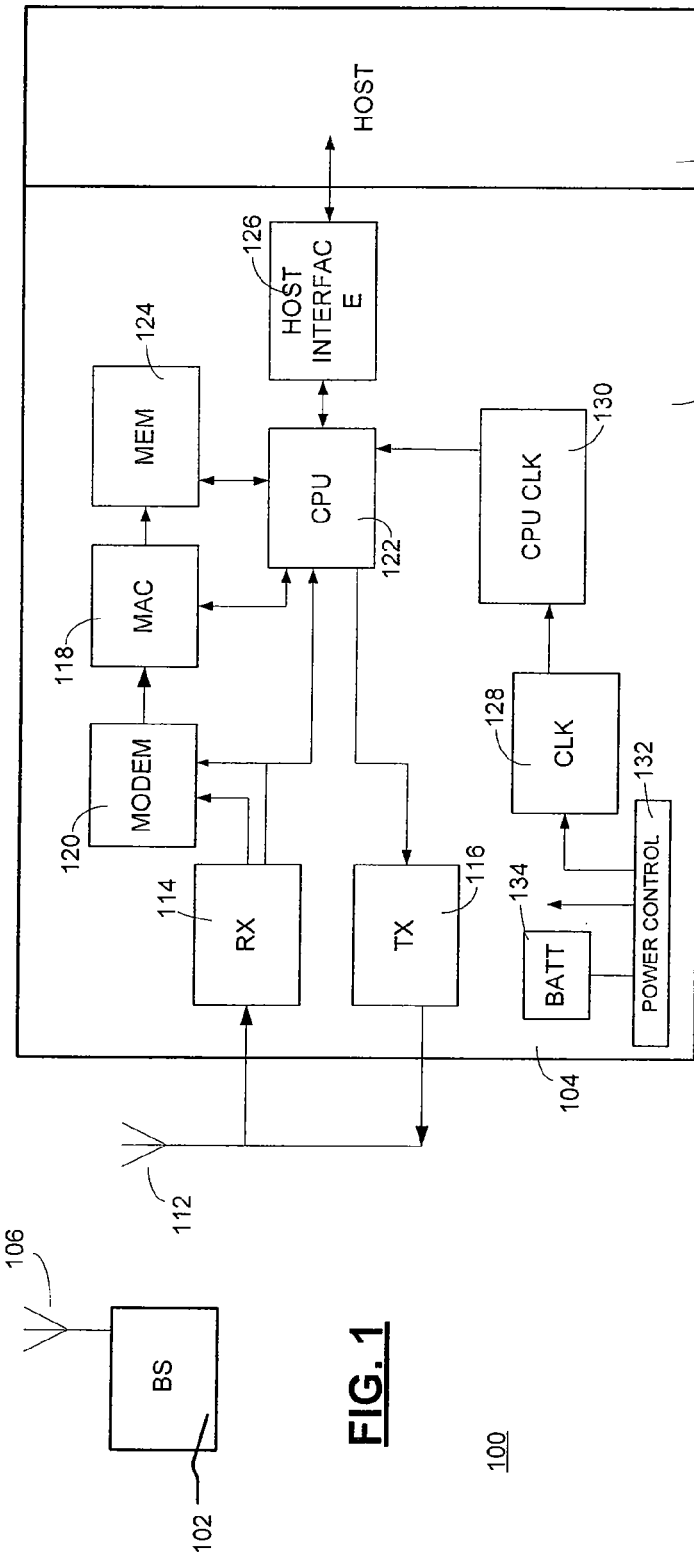
FIG. 1 is block diagram of a radio communication system.

Referring now to the drawing, FIG. 1 is a block diagram of a radio communication system 100. The system 100 includes at least one base station (BS) 102 and at least one subscriber station 104. In FIG. 1, the system 100 is shown with a single BS 102 and a single subscriber station 104 so as to not unduly complicate the drawing figure. However, it is to be understood that the system 100 may be operated with any suitable number of base stations and any suitable number of subscriber stations. The subscriber stations may be fixed or mobile.

Radio communication in the system 100 is accomplished using an air interface standard. The air interface standard defines message format, content and timing to permit reliable communication among components of the system 100, such as BS 102 and subscriber station 104. In the illustrated example, the air interface standard is IEEE Std. 802.16e, published by the Institute of Electrical and Electronics Engineers, Inc. referred to as 802.16. The techniques and principles described herein may of course be extended to other air interface standards, including standards developed for voice and data communication or combinations of the two, for connection oriented and connectionless communication links.

The BS 102 provides radio communication to subscriber stations such as subscriber station 104 in the area surrounding BS 102. The BS 102 is equipped with one or more antennas for radio communication at the appropriate frequency and using the proper modulation. A downlink, from the BS 102 to the subscriber station 104, operates on a point to multipoint (PMP) basis. The IEEE Std. 802.16e wireless link operates with a central BS such as BS 102 and is capable of handling multiple independent communications simultaneously. Within a given frequency channel and antenna sector, all stations receive the same transmission, or parts thereof. The BS 102 is the only transmitter operating in this direction, so it transmits without having to coordinate with other stations, except for the overall time division duplexing (TDD) that may divide time into uplink and downlink transmission periods. The downlink is generally broadcast. Subscriber stations such as subscriber station 104 share the uplink to the BS 102 on a demand basis. Depending on the class of service utilized, the subscriber station 104 may be issued rights to transmit in every frame by the BS 102, or the right to transmit may be granted by the BS 102 after receipt of a request from the user. The BS 102 may also provide communication for the subscriber station 104 to other subscriber stations or to other equipment outside the system 100 (not shown in FIG. 1).

The subscriber station 104 in the illustrated embodiment includes a radio section 108 and a host 110. The radio section 108 provides radio communication with remote radios such as BS 102. The host 110 provides any other data processing or other electronic functions. Examples of the host 110 include a personal computer (PC), a personal digital assistant (PDA), other radio device such as a cell phone, etc. In general, the host 110 uses and benefits from the radio communication provided by the radio section 108.

The radio section 108 includes an antenna 112, a receiver 114, a transmitter 116, a medium access control (MAC) layer 118, a baseband modem 120, a processor 122, memory 124, a host interface 126, a clock circuit 128, a CPU clock circuit 130, a power control circuit 132 and a battery 134. In other embodiments, the radio section 108 may include other or alternative components, and some of the illustrated components may be combined. For example, the receiver 112 and transmitter 114 may be combined as a transceiver.

The antenna 112 is suitable for radio communication at the frequencies and modulation of interest. For radio reception, the antenna 112 converts detected electromagnetic energy into electrical signals and provides the electrical signals to the receiver 114. For a radio transmission, the antenna 112 is provided with electrical signals from the transmitter 116 and converts the electrical signals to electromagnetic energy.

The receiver 114 receives the electrical signals from the antenna 112 and converts them from radio frequency to baseband frequency. The receiver 114 filters the received radio frequency signal and converts these signals to baseband signals or intermediate frequency (IF) signals. The baseband modem 120 then demodulates the received IF or baseband frequency signals and provides the demodulated data to the MAC 118. The MAC 118 decodes the data. The decode is typically done partly in hardware and partly in software.

The transmitter 116 receives baseband signals from the processor 122. The transmitter 116 modulates the baseband signals and shifts them up to radio frequency for transmission by the antenna 112.

The modem 120 is coupled to the receiver 114 to receive the baseband or IF signals. The modem 120 is further coupled with the processor 122 to receive control signals and provide decoded information received from the BS 102 and other transmitters. The modem 120 may be any suitable arrangement, such as custom logic, a gate array or logic array, designed to receive and decode baseband signals. In one implementation, the hardware decoder 120 is designed for decoding information on the downlink, such as the Worldwide Interoperability for Microwave Access (referred to herein after as WiMAX™ or simply WiMAX) downlink map (DLMAP). If the DLMAP changes, the structure or operation of the modem 120 may have to change. In the preferred arrangement, a portion of the DLMAP processing is done with hardware and a portion is done with software. After demodulating baseband information, the modem 120 conveys the result to the MAC for decoding and subsequent storage in the memory 124. Alternatively, the decoded data may be provided directly to the processor 122.

The processor 122 controls operation of the radio section 108 of the subscriber station 104. The processor 122 may be any suitable microprocessor, digital signal processor or other central processing unit (CPU). The processor 122 operates in conjunction with data and instructions stored in the memory 124 to control the operation of the radio section 108. The memory 124 may include any combination of read/write memory, read only memory, flash memory, and any other storage device. The memory 124 may be a single device or may be distributed. For example, a portion of the memory 124 may be integrated with the processor 122. At least a portion of the memory 124 corresponds to the memory space of the processor 122.

The host interface 126 controls exchange of data with the host 110. The host interface 126 is further coupled with the processor 122 to permit exchange of data between the host 110 and the processor 122. In one exemplary embodiment, in which the host 110 engages the radio section 108 for radio communication with a remote source through the BS 102, the host interface 126 receives information from the host 110 for transmission to the remote source and, in turn, receives from the processor 122 information from the remote source. The host interface 126 may operate to encode, decode or otherwise reformat the information for proper usage by the radio section 108 and the host 110.

The clock circuit 128 produces clocking signals to control timing of the components of the radio section 108. Connections to other components are not shown in FIG. 1 so as not to unduly complicate the drawing figure. The CPU clock circuit 130 provides clocking signals to the processor 122. The CPU clock circuit 130 controls the frequency of the processor clock signal. The processor's operating speed is generally related to the frequency of the clock signal provided by the CPU clock circuit 130. When the clock signal has a relatively higher frequency, the processor 122 runs faster, processing data faster. In contrast, when the clock signal has a relatively lower frequency, the processor 122 runs slower. The frequency of the CPU clock circuit 130 is related to the power consumption of the processor 122 and other circuits controlled by the processor 122. When the frequency is higher, the power consumption is higher. Therefore, when possible, it is desirable in a device such as the subscriber station 104 to reduce the clock frequency and the operating frequency of the processor 122 as much as possible.

The power control circuit 132 controls entry into and exit from a low power sleep mode by components of the subscriber station 104. The power control circuit 132 operates to manage depletion of the battery 134, which provides operating power for the subscriber station 104. The power control circuit 132 responds to information about the status of the radio section 108 to place the radio section 108 in a low power sleep mode or to return the radio section 108 from the low power sleep mode to an active mode. For example, if all connections between the subscriber station 104 and other transmitters in the system 100 are in sleep mode, the power control circuit 132 places the subscriber station 104 in the low power sleep mode. In another embodiment, the power control circuit 132 could also control the voltage rails of the different units along with the frequency. Not all connections between the power control circuit 132 and the battery 134 are shown in FIG. 1.

Figure 2:
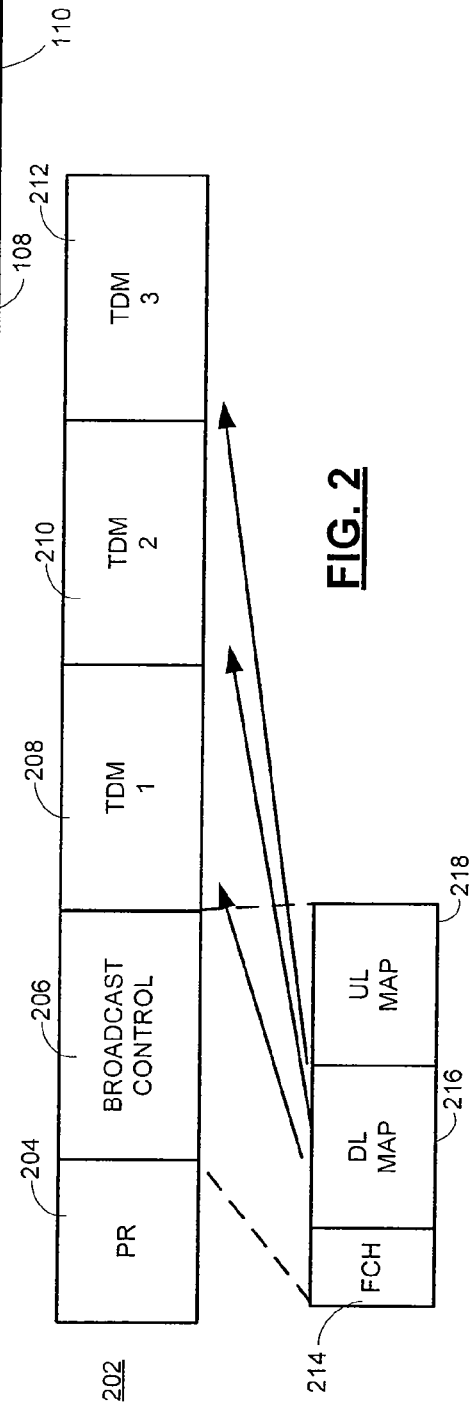
FIG. 2 illustrates communication format in the radio communication system of FIG. 1.

FIG. 2 illustrates communication format in a wireless communication system such as the system of FIG. 1. FIG. 2 shows the format of a down link frame 202 for a time division duplex (TDD) communication system. The down link frame 202 includes a preamble 204, broadcast control section 206, and time division multiple access (TDM) subframes 208, 210, 212.

The preamble 204 is used by the subscriber station 104 to derive time synchronization and phase coherency and filter adaptation. The preamble 204 may include predefined data that may be used by the receiver 114 to adjust to the current channel parameters between the BS 102 and the subscriber station 104.

The broadcast control section 206 includes a frame control header (FCH) 214, a downlink map (DLMAP) 216 and an uplink map (ULMAP) 218. In a point to multipoint transmission system such as WiMAX, the BS 102 is broadcasting to all subscriber stations 104 in the area served by the BS 102. All subscriber stations 104 receive the transmission/broadcast. Information in the DLMAP 206 informs the subscriber stations as to which subscriber station the communication is intended for. Information in the ULMAP informs the subscriber stations about resources assigned on an uplink for responding to the BS 102. The DLMAP 216 and ULMAP 218 form a frame control section of the down link frame 202. The broadcast control section 206 may also include a down link channel descriptor (DCD) message (not shown). A DCD message is transmitted by a BS 102 at a periodic interval to define the characteristics of a downlink physical channel.

After the broadcast control section 206, the following TDM portion carries the data, organized into bursts or subframes 208, 210, 212 with different burst profiles. Each subscriber station 104 receives and decodes the control information of the DLMAP 216 and looks for headers indicating data for that subscriber station 104 in the remainder of the downlink subframes.

Figure 3:
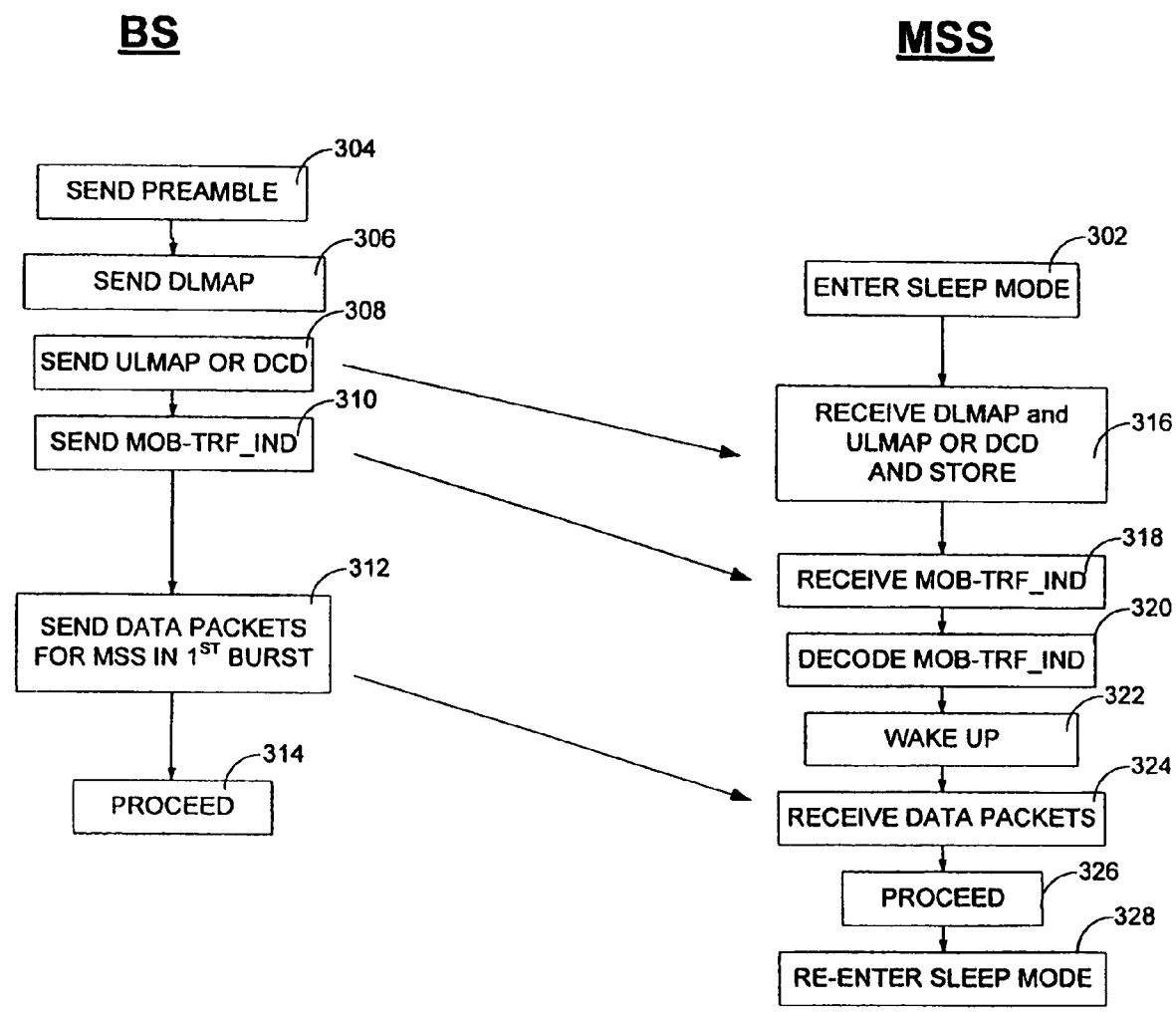
FIGS. 3-5 are flow diagrams illustrating operation of the radio communication system of FIG. 1.

FIG. 3 is a flow diagram illustrating operation of the radio communication system of FIG. 1. The flow diagram of FIG. 3 illustrates an improved technique by which the subscriber station 104 may enter sleep mode. Thereby reducing power and conserving battery.

The IEEE 802.16 air interface standard defines sleep mode per connection. The subscriber station 104 negotiates sleep mode per connection. That is, the subscriber station 104, under control of the processor 122 (FIG. 1), determines that sleep mode is an option, for example because there is no current communication traffic. The subscriber station 104 communicates with the BS 102 and exchanges information defining sleep duration, awaken duration and sleep start time. This process is in accordance with the IEEE 802.16 air interface standard.

Once the subscriber station 104 is in sleep mode, it awakens or returns to active mode when it is required to process traffic. This occurs, for example, if the subscriber station 104 receives a mobile traffic indication message from the BSS 102. A mobile traffic indication message indicates that the BS 102 has information to convey to the subscriber station 104, and the information is not control or other overhead information, but rather traffic for processing. In the example of a WiMAX system, a mobile traffic indication message is referred to as a MOB-TRF_IND message. Further, the subscriber station 104 awakens if it receives data traffic on a connection which is in sleep mode. Finally, the subscriber station 104 returns to active mode if it receives traffic on a host interface, such as the host interface 126 of the subscriber station 104 of FIG. 1.

Since many wireless communication systems utilize frame-based protocols, such as IEEE 802.16, these awaken indications are typically sent at any time in a down link frame. As a result, a particular subscriber station 104 must demodulate and decode the entire down link frame to find an indication intended for the particular subscriber station 104. Demodulation is performed by the receiver 114 and associated circuitry to convert the received signals to baseband. Decoding is done by the modem 120 and MAC 118 or the processor 122. A down link frame can be up to 5 ms in duration. Performing these functions during that entire duration can consume substantial battery power and deplete the battery 134.

In accordance with one embodiment, the mobile traffic indication message is sent by the BS 102 to the subscriber station 104 only as part of the first downlink burst. For example, in a WiMAX system, the MOB-TRF_IND message, if present, is sent after the ULMAP or a DCD message.

This situation is illustrated in the flow diagram of FIG. 3. At block 302, the subscriber station 104 enters the sleep mode. In the sleep mode, whatever circuitry that can be powered down has been powered down under control of for example, the power control circuit 132. The receiver 114 may remain active to receive transmitted control information and convert the received information to baseband and store the information without decoding. The decoding components, such as the modem 120, the MAC 118 and the processor 122, are preferably powered down.

At block 304, the base station BS 102 begins a transmission for the subscriber station 104. The BS 102 formats a communication, for example, in the format illustrated in FIG. 2. The communication will include several bursts, for example, as illustrated in FIG. 2. Only formation of a first burst is illustrated in FIG. 3.

The BS 102 sends a FCH 214. The FCH 214 is used by the receiver 114 to synchronize and equalize the received signals.

At block 306, the BS 102 sends the DLMAP. At block 308, the BS 102 sends the ULMAP or DCD message, in accordance with the IEEE 802.16 protocol. At block 310, the BS 102 transmits a MOB-TRF_IND message, the receipt of which causes the subscriber station 104 to exit the low power sleep mode and return to active mode.

After sending the mobile traffic indication message or MOB-TRF_IND message as part of the first burst, the BS 102 continues transmitting the rest of its communication. This includes sending data packets for the MSs 104 in the first burst, at block 312, after the MOB-TRF_IND message. The BS 102 then sends the remaining bursts with information for other subscriber stations in the system, at block 314.

At the subscriber station 104, the information sent by the BS 102 is detected and processed as appropriate. The FCH is used to equalize the receiver 114 and obtain synchronization. At block 316, the DLMAP and either the ULMAP or DCD messages are received and decoded. Based on the information in these messages, the subscriber station is able to identify the down link channel and the uplink channel.

At block 318, the subscriber station 104 detects the MOB-TRF_IND message sent by the BS 102 at block 310. This message is decoded at block 320, using the MAC 118 or the processor 122. In response to detecting and decoding the MOB-TRF_IND message, at block 322 the subscriber station 104 exits the low power sleep mode or wakes up. The subscriber station 104 is now in a position to process the data traffic being sent to it by the BS 102, including receiving and decoding the data packets, at block 324, sent by the BS 102. At block 326, the subscriber station 104 receives and processes the information contained in the data packets. When conditions permit, the subscriber station 104 returns to the sleep mode, at block 328, in the conventional fashion.

If there is no traffic for the subscriber station 104 at block 310, the BS 102 does not transmit the MOB-TRF_IND message. Accordingly, at blocks 318, 320, there is no MOB-TRF_IND message to receive and detect. If no MOB-TRF_IND message is detected, the subscriber station 104 remains in the low power sleep mode, thereby conserving maximum battery power. By positioning the MOB-TRF_IND message at or near the beginning of a transmission from the BSS 102 to a subscriber station 104, the subscriber station 104 can remain in the low power sleep mode for the maximum duration.

In a WiMAX system, each down link frame can be 5 ms in duration. In accordance with this embodiment, the subscriber station 104 remains in sleep mode rather than having to exit the sleep mode to decode the entire first down link frame. In such a case, assuming a frame with four bursts of equal duration, this embodiment provides a saving of more than 200% in sleep mode power conservation. Other wireless systems employing this technique may benefit as much or more.

Figure 4:
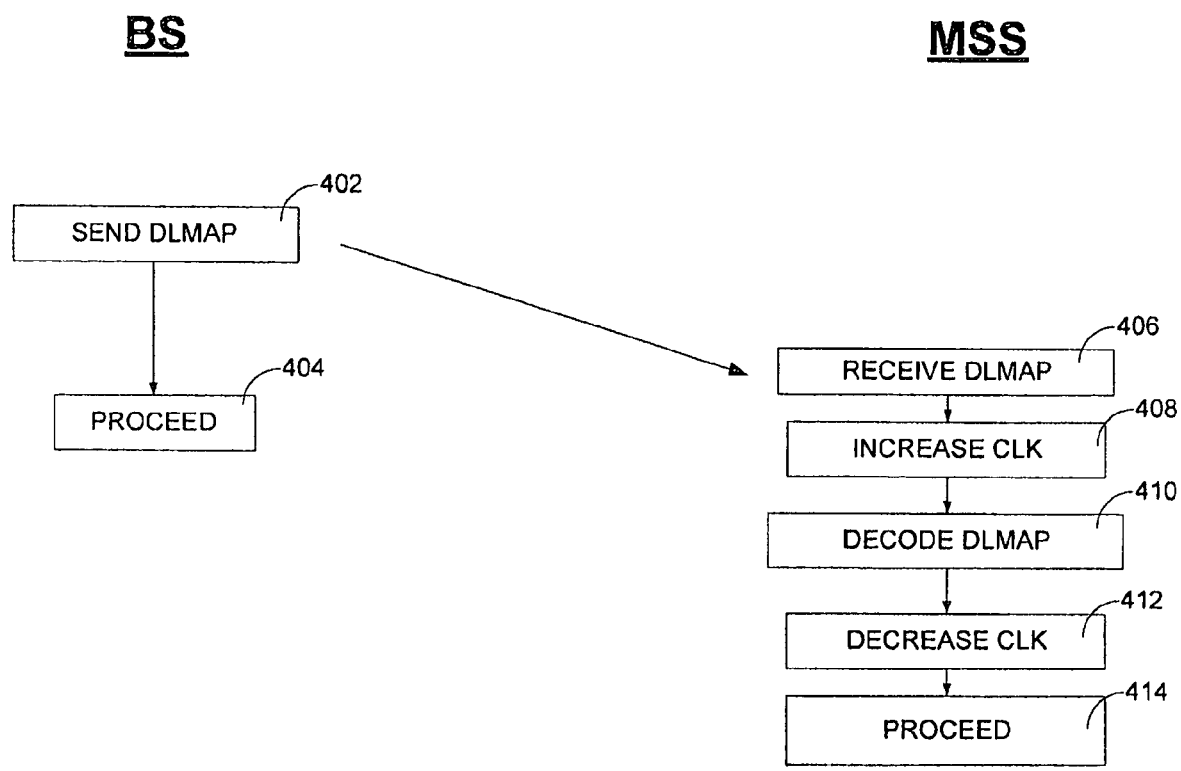

FIG. 4 is a flow diagram illustrating another aspect of operation of the radio communication system of FIG. 1. The illustrated operation can further reduce sleep mode power consumption by properly controlling the CPU clock signal based on the frame processing requirement of the received frame. In this example, the WiMAX downlink map (DL-MAP) requires a higher CPU clock frequency as the DLMAP message is decoded before the baseband buffer overflows. In the context of FIG. 1, the baseband buffer is a portion of memory 124 storing information which has been received at the subscriber station 104 and converted to baseband signals, but not yet decoded. In conventional systems, the CPU clock is either fixed at the speed required to decode the DLMAP in the required amount of time, or the CPU clock may toggle between on and off, where the on frequency is the speed required to decode the DLMAP in the required amount of time. This on-off toggling provides some power savings by turning off the CPU clock when not needed. However, there is room for further improvement.

In accordance with this embodiment, a low power implementation involves first, increasing the CPU clock to a higher frequency to process the DLMAP, and second, reducing the CPU clock to a lower frequency after the DLMAP has been processed. The CPU clock is active at all times. That is, the CPU clock is not turned off altogether. However, the frequency or operational speed of the CPU clock is adjusted according to the content of the frame so that frame portions requiring rapid processing are processed with a high speed clock signal and frame portions permitting slower processing are processed with a low speed clock signal. Since power dissipation from the battery is generally proportional to the clock frequency, this embodiment further reduces power consumption and extends battery life.

This process is illustrated in FIG. 4. FIG. 4 is a modification of a portion of the flow illustrated in FIG. 3. At block 402, the BS 102 transmits a DLMAP, analogous to block 306 of FIG. 3. Subsequently, as indicated by block 404, the BS 102 proceeds with its remaining transmission activity in accordance with the air interface standard.

At the MS 104, at block 406, the DLMAP is received. The frame portion including the DLMAP is detected by the receiver 114, converted to baseband and stored in memory for processing. The processor 122 becomes aware that the DLMAP is available, either based on information provided by the receiver 114 or because system timing corresponds to a time when the DLMAP should be present, and begins processing the DLMAP.

At block 408, the processor clock is increased. In the embodiment of FIG. 1, this may be done by use of the CPU clock circuit 130. The CPU clock circuit 130 provides clocking signals to the processor 122. The CPU clock circuit 130 controls the frequency of the processor clock signal based on the frequency of the clock signal received from the clock circuit 128. When a frame portion requiring high speed processing is encountered, the CPU clock circuit 130 increases the clock signal provided to the processor 122, thereby increasing the processing speed of the processor 122.

At block 410, the DLMAP is decoded by the processor 122 operating at the relatively higher clock frequency. In a WiMAX system, the DLMAP may be large in size and contains substantial information. Because the DLMAP defines the features and format of the downlink, the subscriber station 104 must decode the DLMAP substantially in real time or as the DLMAP is received. Operating the processor 122 at a clock frequency sufficient for decoding the received data in the time required ensures that the DLMAP is decoded accurately. At block 412, once the DLMAP is processed, the clock speed or clock frequency is reduced to a slow, non-zero rate so that some data processing can continue at block 414. However, due to the reduced clock frequency, the power consumption of the subscriber station 104 during this time is substantially reduced relative to power consumption during times when the processor clock speed is relatively high.

This technique can, of course, be extended beyond a WiMAX system. Other systems using a known data format may employ this technique as well. Any time some of the received data must be processed at a relatively high clock frequency, or may be processed at a relatively low clock frequency, the clock frequency used to process the data may be adjusted accordingly to minimize power drain in the system. This technique may be extended even farther, to a case in which the location of high-decode-speed data or low-decode-speed data is contained in the frame itself. The receiving system may read control information contained in the frame, locate the data to be processed in the frame and adjust clock speed accordingly. The adjusted clock speed may be a processor clock, as illustrated in FIG. 1, or may be a hardware decoding clock, or any other type of timing signal.

Figure 5:
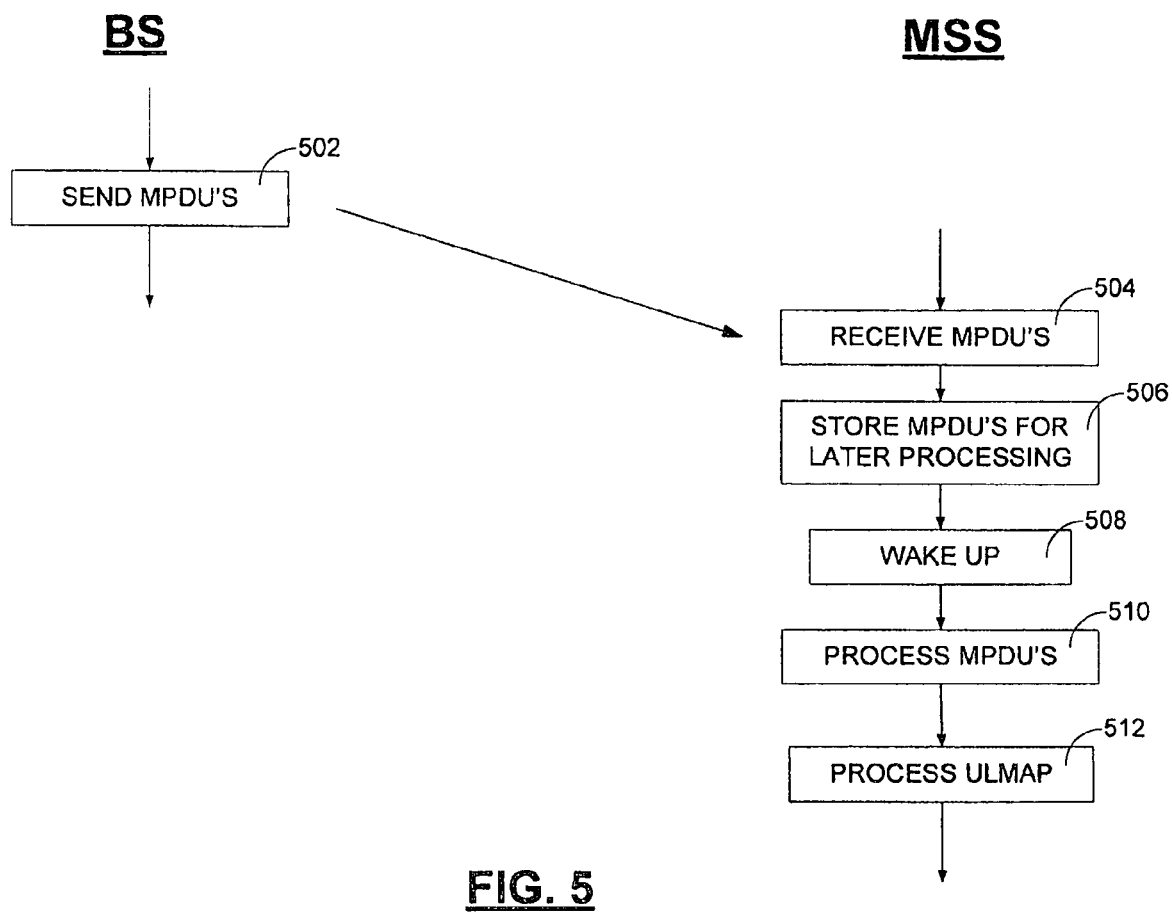

FIG. 5 is a flow diagram illustrating another aspect of operation of the radio communication system of FIG. 1. The illustrated operation can further reduce sleep mode power consumption by batch processing control messages sent on the downlink from the BS 102 to the subscriber station 104.

In a WiMAX system, during normal operation, received bursts are de-concatenated into MAC Protocol Data Unit (MPDU). A MPDU is the data unit exchanged between peer entities of the same protocol layer. On the downlink, the MPDU is the data unit generated for the next lower layer. The subscriber station 104 checks the connection identifier (CID) for each MPDU and compares the CID with a list of CIDs it maintains for CID filtering. Only if the CID matches the CID filter is the frame processed and system clocks enabled.

During sleep mode, the subscriber station 104 needs to process the ULMAP. This is done, for example, to determine whether the subscriber station 104 needs to send a bandwidth request in the next frame. The subscriber station 104 must also process the uplink channel descriptor (UCD) message and the downlink channel descriptor (DCD) message. The UCD message defines the characteristics of an uplink channel from the subscriber station 104 to the BS 102. The DCD message defines the characteristics of a downlink channel to the subscriber station 104 from the BS 102. There are other broadcast messages sent by the BS 102 which the subscriber station 104 must process since they contain important control information. In a conventional implementation, this control information (contained in the MPDUs) is processed as soon as it is received to ensure low latency. Processing in this context involves decoding the received control information and acting on instructions and data decoded therefrom.

In accordance with this embodiment, these control messages may be processed in a batch at the end of a frame. The only message that requires quick processing is the DLMAP. The DLMAP should be processed sufficiently early to allow programming an uplink channel descriptor for the next burst.

For enhanced low power consumption in sleep mode, the subscriber station 104 receives MPDUs sent by the BS 102 and creates a batch of MPDUs to be processed by the processor. These messages are processed by the processor 122 either before or after the DLMAP is processed.

This process is illustrated in FIG. 5. At block 502, the base station BS 102 sends MPDUs to the subscriber station 104. The MPDUs may include any control message that does not require urgent or near-real-time processing, but whose processing may be deferred for a time. At block 504, the MPDUs sent from the BS 102 are received at the subscriber station 104. During this time, the subscriber station 104 is in the low power sleep mode. For example, the receiver is active and functioning to demodulate received messages such as the MPDUs. However, other portions of the subscriber station 104 such as the modem 118 and the processor 122 are in a low power condition and unable to decode the received MPDUs.

At block 506, the subscriber station 104 stores the received MPDUs for subsequent processing. The MPDU data may be stored in any convenient memory location of the subscriber station 104. At block 508, the subscriber station 104 exits the low power sleep mode and, at block 510, processes the MPDUs. The received MPDUs are processed as a batch. That is, all MPDUs received during the sleep mode are processed only when the subscriber station 104 exits the sleep mode to process information which must be processed rapidly, such as the ULMAP, at block 512. In one embodiment, processing involves increasing the CPU clock signal frequency, decoding the received control messages as a group, then reducing the CPU clock signal frequency. The MPDUs may be processed before the ULMAP, as shown in FIG. 5, or they may be processed after the ULMAP. This enhancement ensures that the CPU clock signal is changed only once when the ULMAP is to be processed.

Figure 6C:
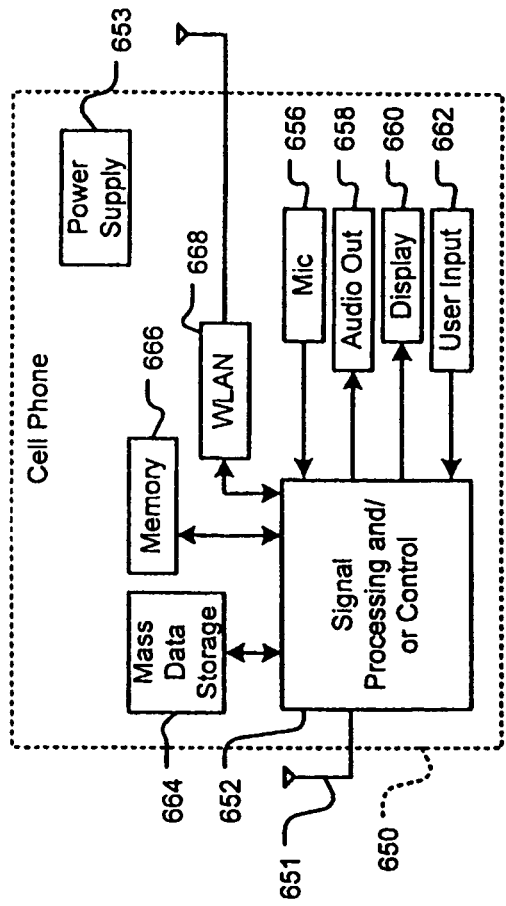
FIG. 6C is a functional block diagram of a cellular phone.

Referring now to FIGS. 6A-6F, various exemplary implementations of the present invention are shown. As shown in FIG. 6A, the present invention can be implemented in a high definition television (HDTV) 620. The HDTV 620 includes a wireless local area network (WLAN) circuit 629 which may be configured in accordance with the subscriber station 104 of FIG. 1. The present invention may be implemented in either or both signal processing and/or control circuits, which are generally identified in FIG. 6A at 622 or a WLAN interface 629. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices. The HDTV 620 may be connected to memory 628 such as random access memory (RAM), read only memory (ROM), low latency nonvolatile memory such as flash memory and/or other suitable electronic data storage. The HDTV 620 also may support connections with a WLAN via a WLAN network interface 629.

Referring now to FIG. 6B, the present invention may be implemented in a WLAN interface 648 of a vehicle 630. The vehicle 630 includes a wireless local area network circuit 648 which may be configured in accordance with the subscriber station 104 of FIG. 1. In some implementations, the present invention may be implemented as part of a power train control system 632 that receives inputs from one or more sensors 646 such as temperature sensors, pressure sensors, rotational sensors, airflow sensors and/or any other suitable sensors; the power train control system 630 also generates one or more output control signals 638, such as engine operating parameters, transmission operating parameters, or other control signals.

The present invention may also be implemented in another control system 640 of the vehicle 630. The control system 440 may likewise receive signals from input sensors 642 and output control signals 644. In some implementations, the control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 632 may communicate with mass data storage 646 that stores data in a nonvolatile manner. The mass data storage 646 may include optical and/or magnetic storage devices including, for example, hard disk drives (HDDs) and/or digital video disks (DVDs). The powertrain control system 632 may be connected to memory 647, such as RAM, ROM, low latency nonvolatile memory such as flash memory and/or other suitable electronic data storage. The control system 640 may also include mass data storage, memory and/or a WLAN interface (all not shown).

Referring now to FIG. 6C, the present invention can be implemented in a cellular phone 650 that may include a cellular antenna 651. The cellular phone 650 includes a wireless local area network circuit 668 which may be configured in accordance with the subscriber station 104 of FIG. 1. In some implementations, the cellular phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the cellular phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices including, for example hard disk drives (HDDs) and/or DVDs. The cellular phone 650 may be connected to memory 666 such as RAM, ROM, low latency nonvolatile memory such as flash memory and/or other suitable electronic data storage.

Figure 6D:
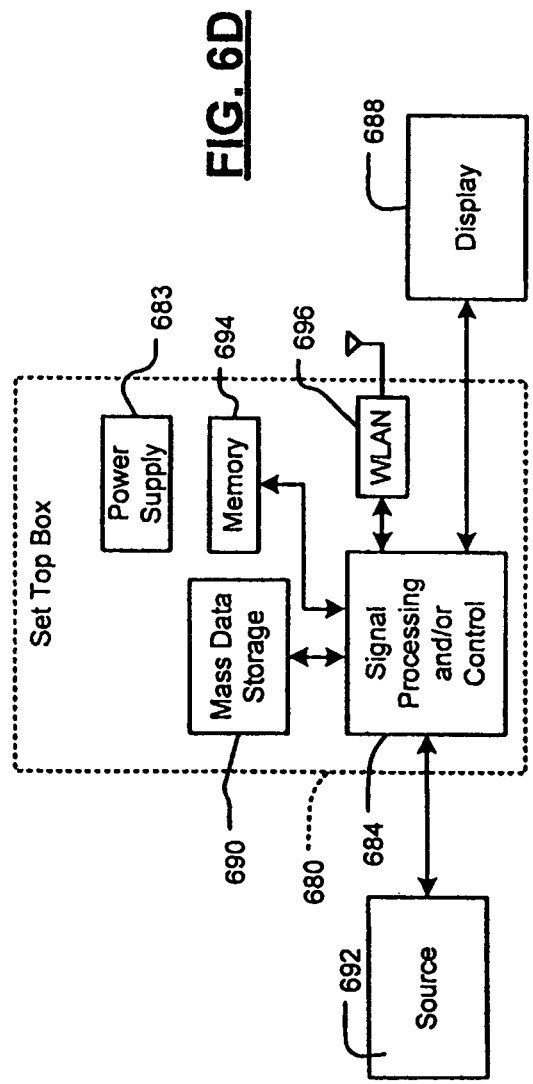
FIG. 6D is a functional block diagram of a set top box.

Referring now to FIG. 6D, the present invention can be implemented in a set top box 680. The set top box 680 includes a wireless local area network circuit 696 which may be configured in accordance with the subscriber station 104 of FIG. 1. The set top box 680 receives signals from a source 692 such as a broadband source and outputs standard and/or high definition audio/video signals suitable for a display 688 such as a television, monitor or other video and/or audio output devices. The signal processing and/or control circuits 684 and/or other circuits (not shown) of the set top box 680 may process data, perform coding and/or encryption, perform calculations, format data and/or perform any other set top box functions.

The set top box 680 may communicate with mass data storage 690 that stores data in a nonvolatile manner. The mass data storage 690 may include optical and/or magnetic storage devices for example hard disk drives (HDDs) and/or DVDs. The set top box 680 may be connected to memory 694 such as RAM, ROM, low latency nonvolatile memory such as flash memory and/or other suitable electronic data storage.

Figure 6E:
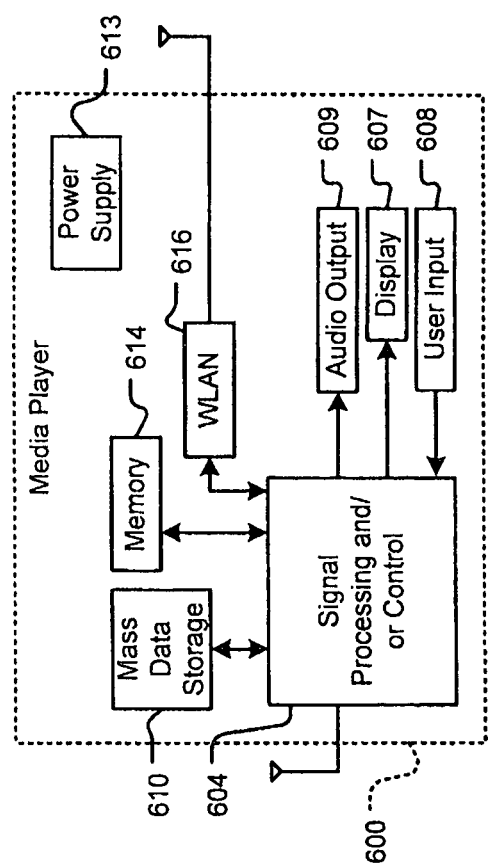
FIG. 6E is a functional block diagram of a media player.

Referring now to FIG. 6E, the present invention can be implemented in a media player 600. The media player 600 includes a wireless local area network circuit 616 which may be configured in accordance with the subscriber station 104 of FIG. 1. In some implementations, the media player 600 may include a display 607 and/or a user input 608 such as a keypad, touchpad and the like. In some implementations, the media player 600 may employ a graphical user interface (GUI) that typically employs menus, drop down menus, icons and/or a point-and-click interface via the display 607 and/or user input 608. The media player 600 may further include an audio output 609 such as a speaker and/or audio output jack. The signal processing and/or control circuits 604 and/or other circuits (not shown) of the media player 600 may process data, perform coding and/or encryption, perform calculations, format data and/or perform any other media player functions.

The media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives (HDDs) and/or DVDs. The media player 600 may be connected to memory 614 such as RAM, ROM, low latency nonvolatile memory such as flash memory and/or other suitable electronic data storage. Still other implementations in addition to those described above are contemplated.

It is intended that the foregoing detailed description be understood as an illustration of selected forms that the invention can take and not as a definition of the invention. It is only the following claims, including all equivalents, that are intended to define the scope of this invention.

What is claimed is:

1. A method for managing power consumption in a subscriber station in a wireless communication system, the method comprising:
    engaging the subscriber station in sleep mode; and
    while the subscriber station is in the sleep mode,
        receiving, at the subscriber station, a first portion of a frame, the first portion including (i) a downlink map (DLMAP) and (ii) at least one of (a) an uplink map (ULMAP) or (b) a downlink channel descriptor (DCD) message,
        analyzing only the first portion to determine if there is a wake up indicator in the first portion at a location after (i) the DLMAP and (ii) at least one of (a) the ULMAP or (b) the DCD message, and
        directing the subscriber station to exit the sleep mode if the wake up indicator is present in the first portion at the location after (i) the DLMAP and (ii) at least one of (a) the ULMAP or (b) the DCD message, or otherwise maintaining the subscriber station in the sleep mode.

2. The method of claim 1, wherein communication to and from the subscriber station is in accordance with IEEE Std. 802.16.

3. The method of claim 1, further comprising:
    while the subscriber station is in the sleep mode,
        receiving, at the subscriber station, one or more remaining portions of the frame, the one or more remaining portions including a plurality of control messages, and
        storing the plurality of control messages in memory for later decoding; and
    after the subscriber station exits the sleep mode, processing the plurality of control messages.

4. The method of claim 1, further comprising:
    increasing a decoding clock rate and processing the present downlink map based on the increased decoding clock rate; and
    decreasing the decoding clock rate after processing the received downlink map.

5. A method for managing power consumption in a subscriber station, the method comprising:
    engaging the subscriber station in sleep mode, including reducing a frequency of a system clock in the subscriber station;
    wirelessly receiving a message having downlink transmission parameters while the subscriber station is in the sleep mode;
    in response to wirelessly receiving the message, increasing the frequency of the system clock to a frequency sufficient to process the message including gating a clock signal on to a portion of the subscriber station required to process the message during the time required to process the message; and
    subsequent to processing the message, reducing the frequency of the system clock from the frequency sufficient to process the message.

6. The method of claim 5, wherein reducing the frequency of the system clock from the frequency sufficient to process the message comprises:
    gating a clock signal off to the portion of the subscriber station required to process the message.

7. The method of claim 5, wherein increasing the frequency of the system clock to the frequency sufficient to process the message comprises:
    increasing the frequency of a clock signal provided to a portion of the subscriber station required to process the message during the time required to process the message.

8. The method of claim 7, wherein reducing the frequency of the system clock from a frequency sufficient to process the message comprises:
    decreasing the frequency of the clock signal provided to the portion of the subscriber station required to process the message.

9. A method for managing power consumption in a subscriber station in a wireless communication system, the method comprising:
    engaging the subscriber station in a sleep mode;
    while the subscriber station is in the sleep mode, i) wirelessly receiving control messages that do not require immediate processing, and ii) storing the control messages without processing the control messages;
    exiting the subscriber station from the sleep mode at a predetermined time to process a predetermined transmission wirelessly received, at the subscriber station, from a base station, the predetermined transmission including a downlink map;

after exiting the subscriber station from the sleep mode, processing the stored control messages before or after processing the predetermined transmission; and re-engaging the subscriber station in the sleep mode after processing i) the predetermined transmission and ii) the stored control messages.

10. The method of claim 9, further comprising:

while processing the predetermined transmission, increasing a clock rate of a system clock in the subscriber station to permit decoding of the predetermined transmission during reception of the predetermined transmission.

11. An operating method for a subscriber station operable in a wireless communication system, the wireless communication system including a base station that communicates using multi-burst frames, the method comprising:

the subscriber station entering a low power sleep mode; and while the subscriber station is in the low power sleep mode, detecting whether a mobile traffic indicator message is present in a wirelessly received first burst of the multi-burst frame by processing only a first portion of the multi-burst frame, wherein the mobile traffic indicator message follows a downlink map, wherein if no mobile traffic indicator message is detected in the first burst of the multi-burst frame, the subscriber station maintaining the low power sleep mode, and wherein if the mobile traffic indicator message is detected, decoding data packets transmitted by the base station for the subscriber station.

12. The method of claim 11, further comprising:

detecting at the subscriber station a downlink map transmitted by the base station;

increasing the frequency of a system clock to a processor in the subscriber station;

at the processor, processing the downlink map according to the increased system clock frequency;

after processing the downlink map, decreasing the frequency of the system clock to the processor in the subscriber station.

13. The method of claim 12, further comprising:

receiving control messages at the subscriber station while the subscriber station is in the low power sleep mode;

storing the received control messages without processing the received control messages;

after increasing frequency of the system clock, at the processor in the subscriber station, processing the received control messages before or after processing the downlink map.

14. A subscriber station operable in a wireless communication network including at least one base station, the subscriber station comprising:

a power control circuit operative to switch the subscriber station between a low power sleep mode and an active mode;

a receiver operative to demodulate radio signals transmitted as a multi-burst frame from the base station, the multi-burst frame including a downlink map; and a processor coupled to the receiver and operative to decode the demodulated radio signals;

the processor operative to detect whether a mobile traffic indicator message is present in the multi-burst frame after the downlink map and in a first burst of the multi-burst frame by processing only a first portion of the multi-burst frame and, if the mobile traffic indicator message is detected, to direct the subscriber station to exit the low power sleep mode to decode data packets in the first burst before the power control circuit switches the subscriber station from the active mode to the low power sleep mode, wherein the power control circuit is operative to maintain the subscriber station in the low power sleep for the duration of the multi-burst frame mode if no mobile traffic indicator message in the first burst and after the downlink map is detected by the processor.

15. The subscriber station of claim 14, further comprising a clock control circuit operative to vary clock signals provided to the processor, the clock control circuit increasing the frequency of the clock signals provided to the processor in response to receipt of control information from the base station to permit faster decoding of the received control information, the clock control circuit decreasing the frequency of the clock signals provided to the processor upon completion of decoding of the received control information.

16. The subscriber station of claim 15, wherein the control information comprises the down link map.

17. The subscriber station of claim 14, further comprising a memory operative to store control messages demodulated by the receiver when the power control circuit maintains the subscriber station in the low power sleep mode, the processor being further operative to batch process the stored control messages when the power control circuit switches the subscriber station from the low power sleep mode to the active mode.

18. A base station operable to communicate with one or more subscriber stations in a wireless communication system, the base station comprising:

means for formatting a message to be communicated to a subscriber station, the message including a wake up indicator positioned in the message at a predetermined location at or near the beginning of a first burst in the message and following a downlink map in the message for wireless reception by the subscriber station so that the subscriber station can determine, while in a sleep mode, whether the wake up indicator is present in the message by processing only a first portion of the message; and means for transmitting the message to the subscriber station.

19. A subscriber station operable in a wireless communication system, the subscriber station comprising:

means for demodulating radio signals wirelessly received from a remote base station, the radio signals including a frame having a plurality of bursts;

detecting means for detecting a mobile traffic indicator message positioned in the frame at a predetermined location at or near the beginning of a first burst of radio signals in the frame and following a downlink map in the frame by processing only a first portion of the frame and while the subscriber station is in sleep mode, the mobile traffic indicator message indicating that the first burst is intended for the subscriber station; and decoding means responsive to the detecting means for decoding the demodulated radio signals.

20. The subscriber station of claim 19, further comprising:

power control means for placing the subscriber station in the sleep mode when no traffic is intended for the subscriber station and placing the subscriber station in an active mode when the mobile traffic indicator message indicates that the first burst is intended for the subscriber station.

21. The subscriber station of claim 19, further comprising:
clock control means for providing variable frequency clock signals to the decoding means, the clock control means varying the frequency of the clock signals based on content of the demodulated radio signals.

22. The method of claim 5, wherein the message is a downlink map (DLMAP) message.

\* \* \* \* \*